United States Patent [19]

Hutchings et al.

[11] 4,115,004
[45] Sep. 19, 1978

[54] COUNTERBALANCED OSCILLATING RING LASER GYRO

[75] Inventors: Thomas J. Hutchings, Thousand Oaks; Virgil E. Sanders, Newbury Park, both of Calif.

[73] Assignee: Litton Systems, Inc., Woodland Hills, Calif.

[21] Appl. No.: 741,619

[22] Filed: Nov. 15, 1976

[51] Int. Cl.$^2$ .................... G01B 9/02; G01P 9/00
[52] U.S. Cl. .................... 356/106 LR; 331/94.5 ML
[58] Field of Search .................... 356/106 LR; 331/94.5 ML

[56] References Cited

U.S. PATENT DOCUMENTS

| 3,373,650 | 3/1968 | Killpatrick | 356/106 LR |
| 3,600,095 | 8/1971 | Tanaka | 356/106 LR |
| 3,841,758 | 10/1974 | Gievers | 356/106 LR |

*Primary Examiner*—Vincent P. McGraw
*Attorney, Agent, or Firm*—Harold E. Gillmann

[57] ABSTRACT

A compact and reliable dithered laser gyro utilizes a rectangular laser path geometry to reduce scattering and thereby improve anti-locking capabilities of the laser gyro. In addition, the rectangular geometry serves to reduce the overall package size of the laser gyro and permits the mounting of the anti-lock mechanical dithering drive mechanism within the laser gyro unit. A counterbalance is also provided to reduce vibration from the unit.

9 Claims, 4 Drawing Figures

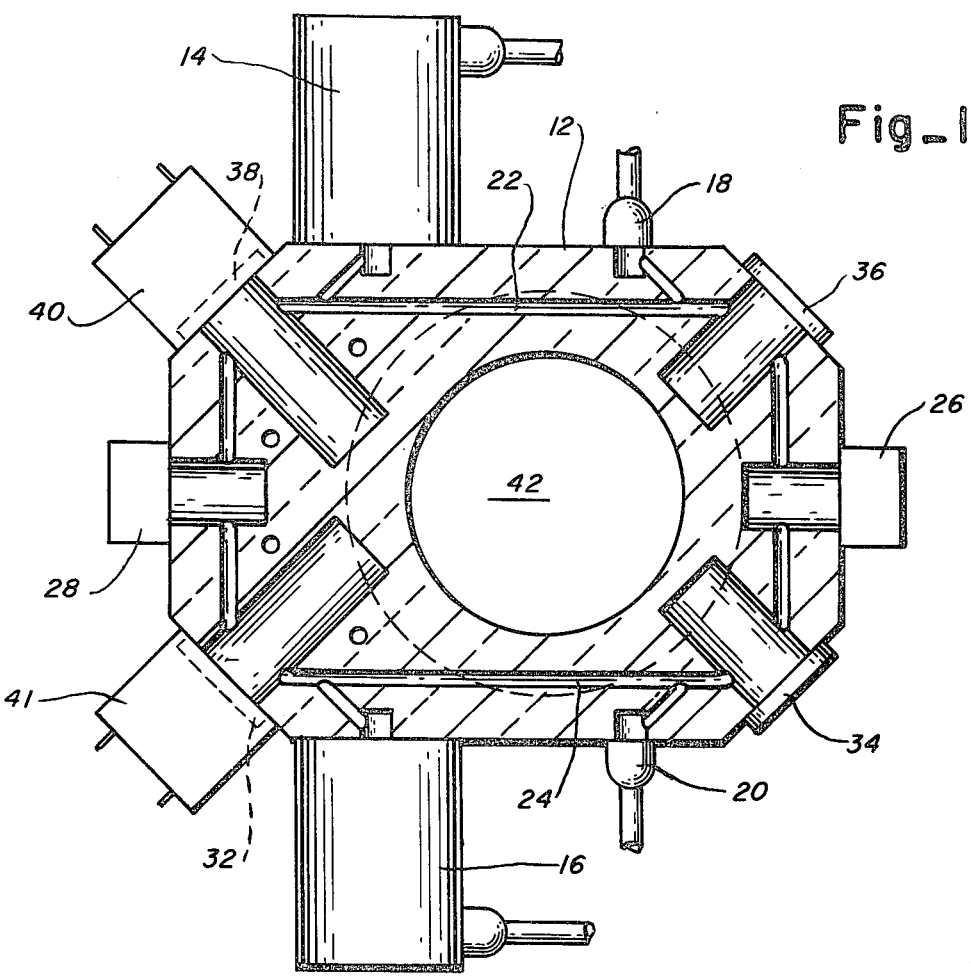
Fig_1
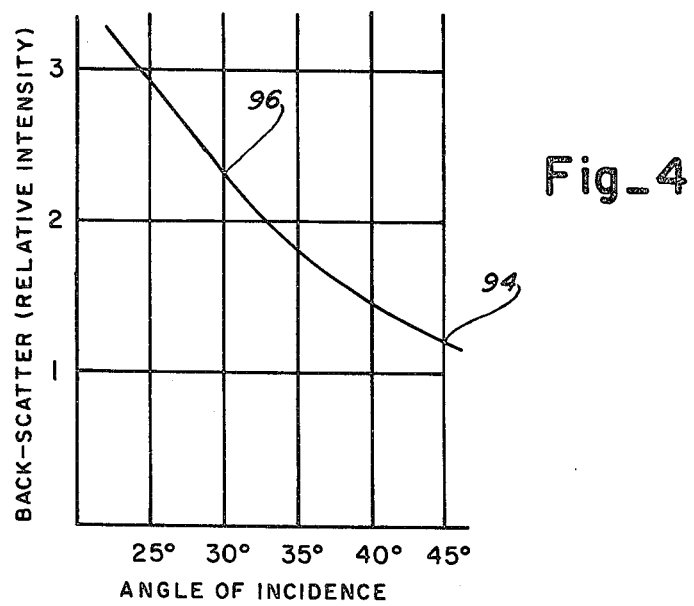
Fig_4

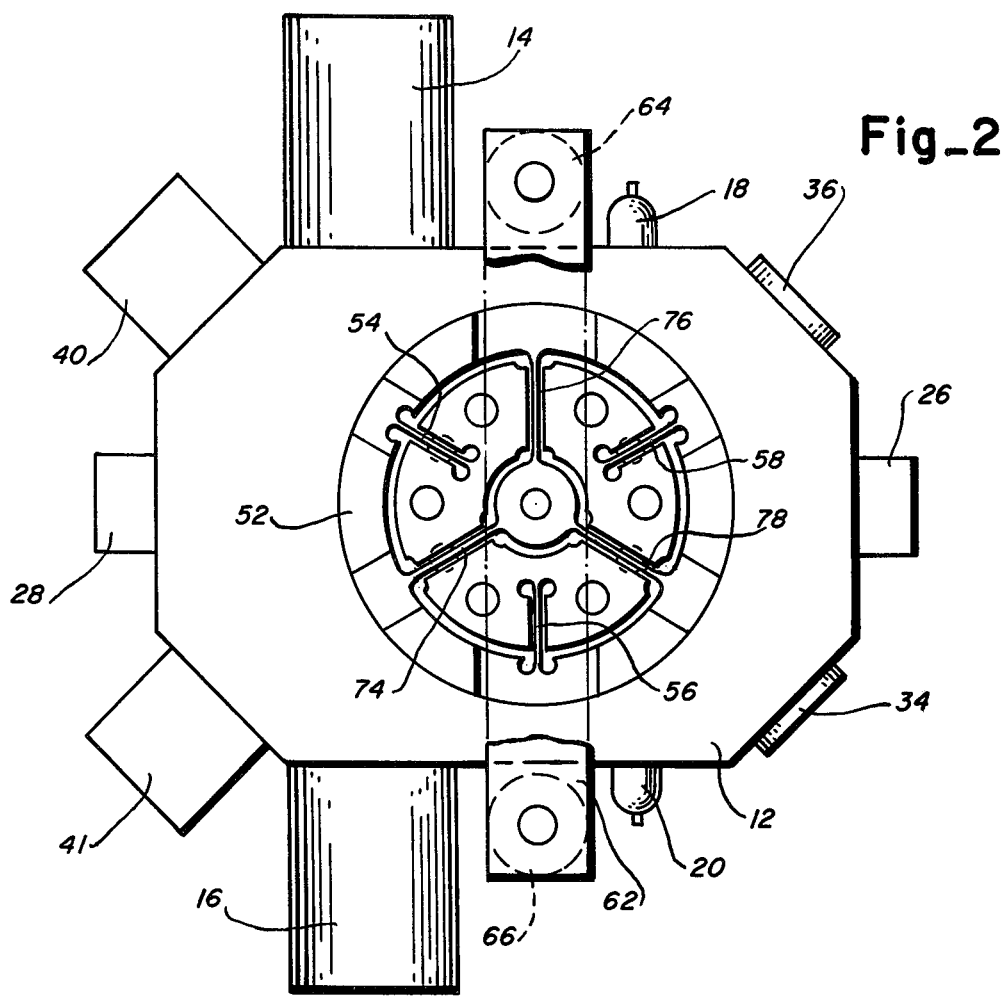
Fig_2
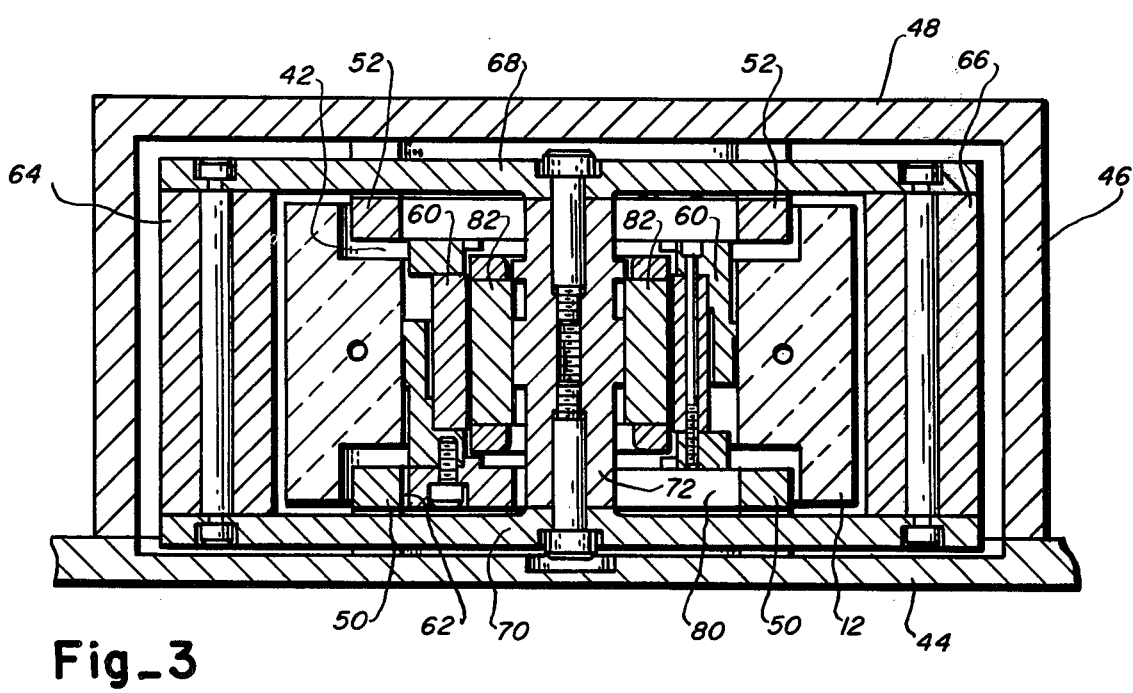
Fig_3

COUNTERBALANCED OSCILLATING RING LASER GYRO

BACKGROUND OF THE INVENTION

This invention relates to laser gyros with mechanically dithered mirrors.

It has previously been proposed to avoid mode locking in laser gyros through the use of individually dithered or mechanically vibrated mirrors. In this connection, and as a general background reference, attention is directed to a text entitled "Laser Applications", edited by Monte Ross, Academic Press, Inc., New York, N.Y., 1971, in which pp. 134 to 200 relating to "The Laser Gyro" are to be noted, especially p. 159 which discusses "dithering" the mirrors of laser gyros. It has also been proposed to use a triangular laser path with three mirrors, in which the body of the laser with the attached mirrors is mounted on leaf springs and oscillated about a central axis perpendicular to the plane of the laser path. Such an arrangement is disclosed in NASA publication No. CR-132261, dated February 1973 for example, and in other published literature.

With regard to such prior proposals for the mechanical dithering of the mirrors of laser gyros, the individual oscillation of mirrors at high frequencies has been sensitive and relatively unstable and has produced results which have generally been inconsistent and unreliable.

On the other hand, the use of a triangular laser gyro path in which the entire triangular unit is vibrated or dithered about a central axis, has given adequate results, but has resulted in a gyro structure which is unduly cumbersome and oversize. In addition, the relatively high scattering resulting from the 30° angle of incidence of the light on the mirrors has resulted in poor anti-lock characteristics, and has therefore reduced the sensitivity of such gyros. Also, undesired vibration has been transmitted to the case of the gyro.

SUMMARY OF THE INVENTION

In accordance with the invention, a laser gyro in which all of the mirrors are vibrated together is provided with a rectangular laser path. As a result of the rectangular path, instead of a triangular path, the angle of incidence of the light on the mirrors is shifted from 30° to 45°, substantially reducing the light scattering, and improving the anti-lock properties and the sensitivity of the gyro. In addition, the use of a rectangular or nearly square laser path greatly reduces the overall size of the gyro package, and also increases the usable space within the laser path.

In accordance with another aspect of the invention, a mechanical drive for rotating or dithering the laser gyro body is located within the body of the laser gyro active element, and, more particularly, lies with the space enclosed by the laser light path.

Another feature of the invention involves the use of a counterbalance or counterweight which is oscillated in opposition to the oscillation of the body of the laser to reduce or eliminate the vibration which would otherwise be transmitted to the case.

Advantages of the gyro include improved sensitivity, reduced size, and substantial elimination of vibration.

Other objects, features and advantages of the invention will become apparent from the consideration of the following detailed description and from the accompanying drawings.

BRIEF DESCRIPTION OF THE DRAWINGS

FIG. 1 is a view of the laser body employed in the assembly of FIGS. 2 and 3;

FIG. 2 is a cut-away top view of a laser gyro assembly illustrating the principles of the present invention;

FIG. 3 is a cross-sectional view of the assembly of FIG. 2; and

FIG. 4 is a plot of back-scattering versus light angle of incidence of a laser.

DETAILED DESCRIPTION

With reference to the drawings, FIG. 1 shows a quartz body 12 having a number of apertures cut into it. The inner passages of the quartz block 12 are sealed and gas is contained within the body of the quartz block. More specifically, the gas is approximately 90% helium and 10% neon, and it is at a pressure of approximately 3 torr, with atmospheric pressure being equal to approximately 760 torrs.

In accordance with known laser practices, two cathodes 14 and 16, and two anodes 18 and 20 are secured to the quartz body 12 and a gas discharge is established between cathode 14 and anode 18 in passage 22, as well as between cathode 16 and anode 20 in passageway 24. Suitable getter structures 26 and 28 are provided at opposite ends of the quartz block 12. As is known in the art, the active metal in the getter structures 26 and 28 is employed to absorb impurities from the gas within the passageways in the body of quartz material 12. Mirrors 32, 34, 36, and 38 are located at the four corners of the optical path of the laser gyro. Two of the mirrors 32 and 38 have associated with them, output structure 40 and 41 from which beats are detected to indicate rotation of the laser gyro structure. Such arrangements for detecting output beats are known in the art and are described in the laser text cited above.

Of course, all of the elements described above, including the mirrors, cathodes, the anodes, and the gettering structures are all tightly sealed to the quartz body 12 so that the gas within the passageways of the quartz body is maintained at the proper pressure and free from contamination.

Laser action occurs in a single mode at approximately $5 \times 10^{14}$ hertz, or cycles per second. This corresponds to a wavelength of approximately 0.633 microns, and the resulting illumination is a brilliant light red color.

A stepped opening 42 is located in the center of the rectangular quartz block 12, and it will receive the driving mechanism for oscillating the laser gyro body as will be described below in connection with FIGS. 2 and 3.

FIGS. 2 and 3 will be described together to bring out the assembly features which are disclosed in these two figures. First, with reference to FIG. 3, the outer casing for the dithered laser gyro is designated by the reference numerals 44, 46 and 48 for the bottom, sides, and top, respectively, of the case. In addition, secured to the bottom 44 is a generally cylindrical support member 50, and a similar generally cylindrical support member 52 depends from the top 48 of the casing.

The laser body 12 as shown in FIG. 1, is mounted from the cylindrical frame members 50 and 52 by three leaf springs. These leaf springs are designated by numerals 54, 56 and 58 in the cut-away upper showing of FIG. 2. The leaf springs 54, 56, and 58, extend inwardly from the upper ring 52 and are secured to an inner magnetic structure which is in turn secured to the laser body 12.

A similar set of three springs is present at the lower edge of the assembly, and one such spring 62 is partially visible in FIG. 3 extending inwardly from the left-hand side of the cylinder 50 forming part of the frame.

As the quartz body oscillates through a small arc about the central axis of the assembly back and forth in one direction, a counterweight executes opposite oscillations about the same axis. The counterweight is made up of two outer members 64 and 66, upper and lower bridging members 68 and 70 and a central axial assembly 72. Note that in FIG. 2 the upper portion of the casing 48 has been completely removed and the upper cross member 68 of the counterweight assembly has been cut away to reveal the supports for both the quartz laser body and also for the counterweight. As mentioned above, the quartz laser body is supported by springs 54, 56 and 58 from the cylindrical frame member 52. In a similar manner, the central portion 72 of the counterweight assembly is supported from frame member 52 by the three springs 74, 76, and 78. At the lower end of the central member 72 of the counterweight assembly an additional set of three leaf springs is provided for securing and resiliently mounting the counterweight assembly on the lower cylindrical frame member 50. One of the lower leaf springs 80 is shown extending between the right-hand side of frame member 50 and the lower end of the central member 72 of the counterweight assembly.

Secured to the central portion 72 of the counterweight assembly is a first magnetic structure 82, which with a second magnetic structure 60, forms a drive motor for the laser body 12 and the counter-oscillating counterweight 64, 66, 68, and 70. One of the magnetic structures 60 may be considered to correspond to a stator and the other magnetic structure 82 to the rotor of a torquer motor. The torquer motor made up of the opposing magnetic structures 60 and 82 is electrically driven at the mechanical resonance frequency of the quartz laser body 12 and its supporting leaf springs, which is identical with the resonance frequency of the counterweight assembly along with its supporting springs. This resonant frequency may, for example, be approximately 150 cycles per second; however, it is to be understood that any desired frequency from a few cycles per second to several hundred or several thousand cycles per second could be employed.

In the arrangements of FIGS. 2 and 3 the power supply to the torquer motor including magnetic structures 60 and 82 is maintained at a relatively low level so that the maximum excursion of the oscillations of quartz body 12 is held to less than 1°. More specifically, in the illustrative structure the maximum excursion is approximately 800 arc-seconds, which is equal to approximately two-ninths of a degree. The counterweight will oscillate in the opposite direction in synchronism and in opposition to the movements of the quartz body. The inertia of the counterweight is approximately equal and opposite to that of the quartz body 12. Accordingly, if the counterweight has a moment of inertia of some fraction such as one-fifth of the moment of inertia of the quartz body, its excursions will be approximately 5 times greater than that of the quartz body and therefore will reach approximately 1°.

It will be appreciated that, with regard to the cylindrical frame members 50 and 52, with the quartz body 12 and the counterweight oscillating in equal and opposite directions in synchronism, little or no vibration will be transmitted from the case of the laser gyro to nearby electronic components or other aircraft instruments which might be vibration sensitive.

Now that the actual mechanical structure of the gyro has been described, certain theoretical aspects of the gyro will be considered. Initially, with regard to the input-output characteristics of a laser gyro, it would be desirable if it were a straight line characteristic, with the output "beats" being directly proportional to rotation, even at very low rates of rotation. Unfortunately, at very low rates of rotation, in a laser gyro of the present single mode type, the counter-rotating laser beams tend to couple, and "lock-in" at a single frequency, and produce no output beats.

However, when the laser body is oscillated at a dithering frequency, the response characteristic very nearly follows the ideal linear characteristic, particularly for low input rates of rotation but has a slight perturbation in the vicinity of the dither frequency.

The magnitude of the departure from linearity caused by the dithering is a function of the tendency of the laser gyro to "lock-in", or for the two counter-rotating beams to oscillate at the same frequency at certain rates of rotation.

This tendency for the laser gyro to "lock-in" is a function of a number of factors, one of which is backscattering. Thus, the tendency for the two modes traveling in opposite directions around the laser light loop to lock together is, not surprisingly, a function of the reflection back along the original direction of light incident on the mirrors around the laser path. FIG. 4 is a plot of relative intensity of back scatter against the angle of incidence of light relative to the vertical. Of course, the angle of incidence for a triangular gyro is 30°, while that for a rectangular gyro as shown in the present arrangements, the angle of incidence is 45°.

As indicated in FIG. 4, the relative back scattering intensity in arbitrary units for a 45° angle of incidence is approximately 1.2 (see point 94) while the back scattering for 30° angle of incidence is approximately 2.32 (see point 96). This corresponds to an approximate ratio of scatter at 45° versus 30° of approximately 0.52. This is equal to an amplitude ratio of the square root of 0.52 which is approximately equal to 0.72. Accordingly, the vector scattered field of a typical laser mirror at 45° is less than three-fourths of that at 30°. The lock-in is related to the random vector sum of the scatter groups in the laser gyro. Thus, for comparison values, a three mirror gyro would have $1 \times \sqrt{3}$ or approximately 1.7, in normalized units, as compared to $0.72 \times \sqrt{4}$ or 1.44 in the same normalized units, for a four mirror rectangular gyro. Hence, scatter amplitude is reduced significantly, on the average, for a rectangular configuration as compared with a triangle.

It is further noted that the rectangular configuration of the laser gyro permits the mounting of the torquer motor within the laser path, while this is not practical with much smaller space available within the triangular configuration of arrangements which have been proposed heretofore. It is estimated that the savings in space resulting from the use of rectangular configuration as compared to a triangular configuration will approximate 50%, or at the minimum the rectangular configuration will be at least one-third less in size than the corresponding triangular configuration.

In conclusion, therefore, the presently proposed dithered laser gyro having the rectangular configuration together with the counterweight arrangements have the advantages of (1) improved sensitivity, (2) reduced size, and thirdly, the advantage of not transmitting significant levels of vibrations to other components.

In the introduction to the present specification certain prior work of others was mentioned. Typical prior patents disclosing related subject matter include U.S. Pat. Nos. 3,373,650, granted Mar. 19, 1968; 3,467,472, granted Sept. 16, 1969; 3,600,095, granted Aug. 17, 1971; and 3,826,575, granted July 30, 1974. These patents all involve some form of movement of the laser body or the associated mirrors, but none discloses the compact and sensitive dithered laser gyro as defined in the present claims.

Although the foregoing description has been directed to one specific preferred embodiment of the invention, it is to be understood that other arrangements are within the scope of one skilled in the art. Thus, for example, but not of limitation, the four mirrors of the laser gyro could be mounted for vibration together apart from the body of the laser gyro, and a lighter weight counterbalancing mechanism could then be employed. Also, other known materials and substances could be employed in place of those specified; thus, the laser body could be made of "U.L.E." titanium silicate from Corning, or of "CERVET" from Owens Ill., instead of quartz. Further, a different type of suspension and/or torquing motor arrangements could be employed with the laser body being oscillated about an axis other than its center, for example. Similarly, other minor changes could be accomplished without departing from the spirit and scope of the present invention.

I claim:

1. A compact laser gyro assembly of improved resolution comprising:
   a ring laser structure including apertures and mirrors which define a rectangular ring laser path;
   a case housing said laser structure; and
   electrical motor driving means mounted within the area bounded by the ring laser path in said laser structure for mechanically oscillating said laser structure with respect to said case.

2. A laser gyro assembly as defined in claim 1 further comprising:
   a counterweight; and
   means for mounting said laser structure and said counterweight for substantially equal and opposing oscillation relative to said case, whereby vibration and power requirements for said assembly are reduced.

3. A laser gyro assembly as defined in claim 2 wherein said counterweight is mounted coaxially with said laser structure.

4. A laser gyro assembly as defined in claim 3 wherein said electrical motor driving means includes stator and rotor type elements mounted respectively on said laser structure and on said counterweight, whereby the vibration transmitted to said case is substantially eliminated as said counterweight and said laser structure oscillate about the same axis in opposite directions.

5. An assembly as defined in claim 2 further comprising resilient means for biasing said laser structure and said counterweight to predetermined rest positions.

6. A laser gyro assembly as defined in claim 2 further comprising:
   first spring mounting means between said counterweight and said case; and
   second spring mounting means between said laser structure and said case.

7. A laser gyro assembly as defined in claim 6 wherein said laser structure and said counterweight are each mounted on sets of axially displaced leaf springs.

8. A laser gyro assembly as defined in claim 6 wherein said laser structure and its spring supports, and said counterweight and its spring support both have substantially the same natural mechanical resonance frequency, and wherein means are provided for energizing said motor driving means substantially at said resonance frequency.

9. A compact laser gyro assembly of improved resolution comprising:
   a rectangular shaped laser structure having four mirrors;
   a single movable member having all four of said mirrors firmly secured to it;
   a case housing said laser structure including said movable member; and
   electrical motor driving means mounted within the area circumscribed by said path in said laser structure for mechanically oscillating said movable member with respect to said case, whereby mode-locking is avoided and dithering perturbations are minimized.

* * * * *